United States Patent [19]

Pierson, Jr.

[11] Patent Number: 4,846,104
[45] Date of Patent: Jul. 11, 1989

[54] AUTOMATED CAT TOILET

[76] Inventor: Harry G. Pierson, Jr., 109 Spring St., West Bridgewater, Mass. 02379

[21] Appl. No.: 150,988

[22] Filed: Feb. 1, 1988

[51] Int. Cl.$^4$ ............................................. A01K 67/00
[52] U.S. Cl. ......................................... 119/1; 209/235
[58] Field of Search .................... 119/1; 209/235, 259, 209/260, 373

[56] References Cited

U.S. PATENT DOCUMENTS

| | | | |
|---|---|---|---|
| 63,170 | 3/1867 | Meyer | 209/373 |
| 369,223 | 8/1887 | Bartlett et al. | 209/373 |
| 436,351 | 9/1890 | Gove | 209/373 |
| 436,352 | 9/1890 | Gove | 209/373 |
| 824,421 | 6/1906 | Galloway | 209/373 |
| 3,908,597 | 9/1975 | Taylor | 119/1 |
| 4,120,264 | 10/1978 | Carter | 119/1 |
| 4,190,525 | 2/1980 | Menzel | 119/1 |
| 4,327,667 | 5/1982 | Bilak | 119/1 |
| 4,574,735 | 3/1986 | Hohenstein | 119/1 |

*Primary Examiner*—Gene Mancene
*Assistant Examiner*—R. Thomas Price
*Attorney, Agent, or Firm*—Fish & Richardson

[57] ABSTRACT

Apparatus for mechanical separation of cat solid waste, randomly buried in cat litter, and cat urine saturated litter clump waste from surrounding clean cat litter and mechanically removing the waste to storage, the apparatus including: a support including a waste collection region; a circular housing that is rotatably mounted about its axis on the support over the waste collection region, the housing having an opening in its periphery for passage of a cat when in a first rotational position and for passage of the solid waste and litter clump waste when in a second, downwardly directed, rotational position over the waste storage region; a solid partition extending inwardly from the periphery at a location adjacent to the opening so as to trap litter on the side opposite of the solid partition from the opening when the opening is in the second rotational position; a screen that retains the solid waste and litter clump waste, the screen extending inwardly from the periphery at a location spaced from the solid partition so as to pass through the litter as the housing is rotated in a manner that causes the opening to move from the first rotational position to the second rotational position, whereby when the housing rotates through a complete revolution, the solid waste and litter clumps are automatically discharged through the opening into the waste collection region, the litter is automatically sifted and aerated by passing twice through the screen, and the litter is retained in the housing.

9 Claims, 5 Drawing Sheets

"AA" (FIG. NO.1)

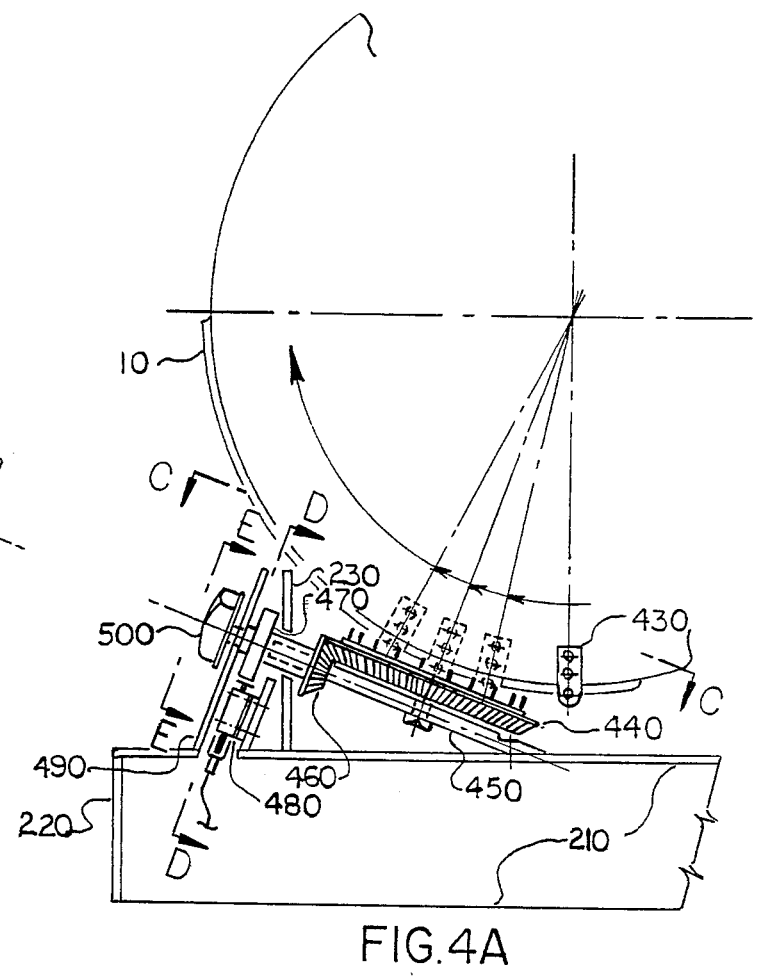
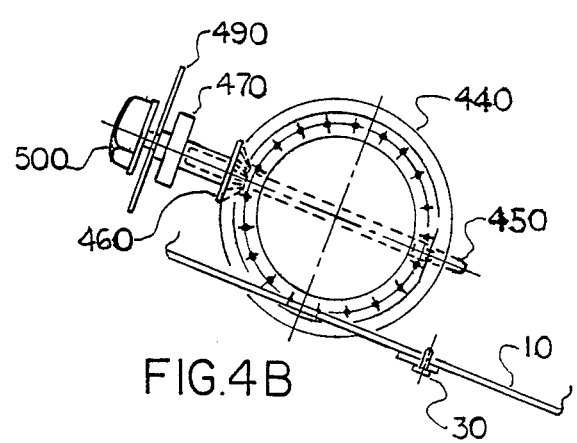

AUTOMATED CAT TOILET

BACKGROUND OF THE INVENTION

The invention relates to separation of cat solid waste, randomly buried in cat litter in a litter box, and cat urine saturated litter clump waste from surrounding cat litter and removing the waste from the litter box.

SUMMARY OF THE INVENTION

The invention as described in this application, a circular housed automated cat toilet, is an improvement over the present open, flat, non-mechanical cat litter box, by providing for automated separation of cat solid waste and wet clumps of urine saturated litter, from the dry clean litter, directing the solid and clump waste to a disposable waste bag, placed as a liner, within a waste storage drawer.

During the process of litter and waste separation, the cat litter is aerated and blended by the deliberate litter tumbling action produced by the slow rotating motion of the circular housing and by double screening over a large mesh plastic flat screen. Thereby, twice each cycle, complete litter treatment is assured, by total contact of all the cat litter with the surrounding air within the circular housing, for continued litter freshness and renewal.

After completion of one 360° rotating cycle of the circular housing, and removal of cat waste, the cat toilet is prepared with cleaned litter for the next cat visit and cat waste discharge. The disposable waste bag liner containing the cat waste may be removed after the completion of the cycle/cycles of the circular housing and replaced by a clean disposable waste bag liner.

The usefulness of this invention is not limited to the automated cleaning of cat litter but includes a number of significant improvements over the present manual methods of cleaning an "open", flat cat litter box, as the containment of the actual cat waste movement and cat waste within a semi-enclosed, nearly isolated atmosphere, the elimination of the odorous and unpleasant task of probing of the cat litter for cat solid wastes and the removal of those wastes with a litter shovel and sifter. The raking, mixing and turnover of the cat litter, to blend damp litter with dry litter is also unnecessary, including the removal of wet litter clumps, since wet litter clumps are usually screened out during the automated toilet cleaning process.

Cat litter in "contact" with the cat solid waste retains odorous traces of the waste as the solids are manually probed and forced against surrounding litter with a sifting shovel. With each additional cat waste discharge in the litter box, additional odor traces are retained, leading to a gradual odor build up and eventual litter replacement. A similar "contact" of clumps of urine saturated litter, with dry litter is obvious, with the "open" flat litter boxes, leading to a further increase of cat waste odors. The rate of odor increase is observed to be somewhat lessened by the automated cat toilet, due to the gentle separating action of the machine and retention of the solid cat waste and clumps of urine saturated litter on the waste separating flat screen. The adjacent dry cat litter is allowed to gently "fall away" from the cat waste, through the openings of the flat screen. Therefore probing and sifting of the cat litter/waste, resulting in excessive litter/waste "contact" is totally eliminated.

The fresh, solid cat waste, buried and covered by the paw scratching of the cat, is observed to be completely coated with cat litter and litter dust. The litter coated solid waste and wet litter clumps are allowed to gently gravitate down and into a disposable waste bag liner in the waste drawer, as the automated toilet rotates thereby removing the total waste without litter probing or intermix of the litter, ensuring a cleaner and less odorous separated litter. Each time a separation of cat waste is effected and a cleaning cycle completed, a small amount of cat litter will be lost to waste, reducing by a minor amount, the overall quantity of available clean litter in storage.

During each cycle, as the circular housing rotates, gravity causes the litter to gently tumble over and over as it filters down through the waste separating flat screen, thereby exposing the entire batch of litter to the atmosphere within the circular housing. The litter tumbling action and complete exposure to the surrounding atmosphere provides a unique litter freshening process not heretofore available in the treatment of cat waste.

As the cycle continues, the screen litter is temporarily stored and the solid and clump waste retained by the flat screen, deposited into a disposable waste bag liner in the waste drawer. Upon reaching a certain point it the rotating cycle, the temporarily stored litter gravitational process is reversed, and the litter falls back through the separating flat screen in a slow, steady, tumbling action, and for the second time is completely aerated in the falling process, and evenly deposited at the circular bottom of the circular housing, ready for the next cat discharge.

In order to provide maximum aeration and litter mixing, the control of the automatic toilet is designed with provisions for selection of one (1) to four (4) individual settings, allowing for one to four complete cycles of the automated litter cleaning process. The maximum aeration of the litter therefore is two (2) times each cycle or eight (8) aerating actions for a setting of four (4) rotating cycles. If two (2) or more cycles are selected, the first cycle will reject solid waste and clump urine waste to the disposable waste bag liner in the waste drawer and the remaining cycles will be for litter aeration and freshening.

Vents, in the form of a series of small holes are located in the upper area of each end of the circular housing, provide for natural exhaust of the housing air. Fresh air will enter the circular housing at the cat entrance. A minor movement of air is created within the circular housing, caused by the housing rotary motion during each cycle, thereby producing a partial air change in the cat discharge area and a corresponding improvement in air freshness. An air freshener may be added to the bag storage compartment of the waste drawer as an aid to odor control, without disturbance or chemical harm to the cat, since the waste drawer area is remote and safe away from the cat waste discharge space, where direct contact with certain air fresheners may be harmful to the cat's well being.

A temporary enclosure cover may be used to close off the cat entrance at the circular housing if there is any question that a cat may enter the housing when operation of the automatic toilet is to begin. The temporary cover is hand snapped in place before starting the automatic toilet and removed by hand when the litter cleaning and aeration cycle(s) have been completed.

BRIEF DESCRIPTION OF DRAWINGS

FIGS. 4A—4D are views, taken at B—B of FIG. 1 and C—C, D—D and E—E of FIG. 4A respectively, showing the details for control of the cleaning cycles for the automated cat toilet;

DETAILED DESCRIPTION OF PREFERRED EMBODIMENT

The automated cat toilet is totally enclosed in a circular housing 10, 11 and 12 with an opening at the housing periphery for a cat entrance 50. A cat entrance step 240 is an aid at the circular housing for the cat entrance and egress. The step is covered with a carpet to assist in cat footing and act as a scratching surface for cat claw sharpening.

Figure 1:
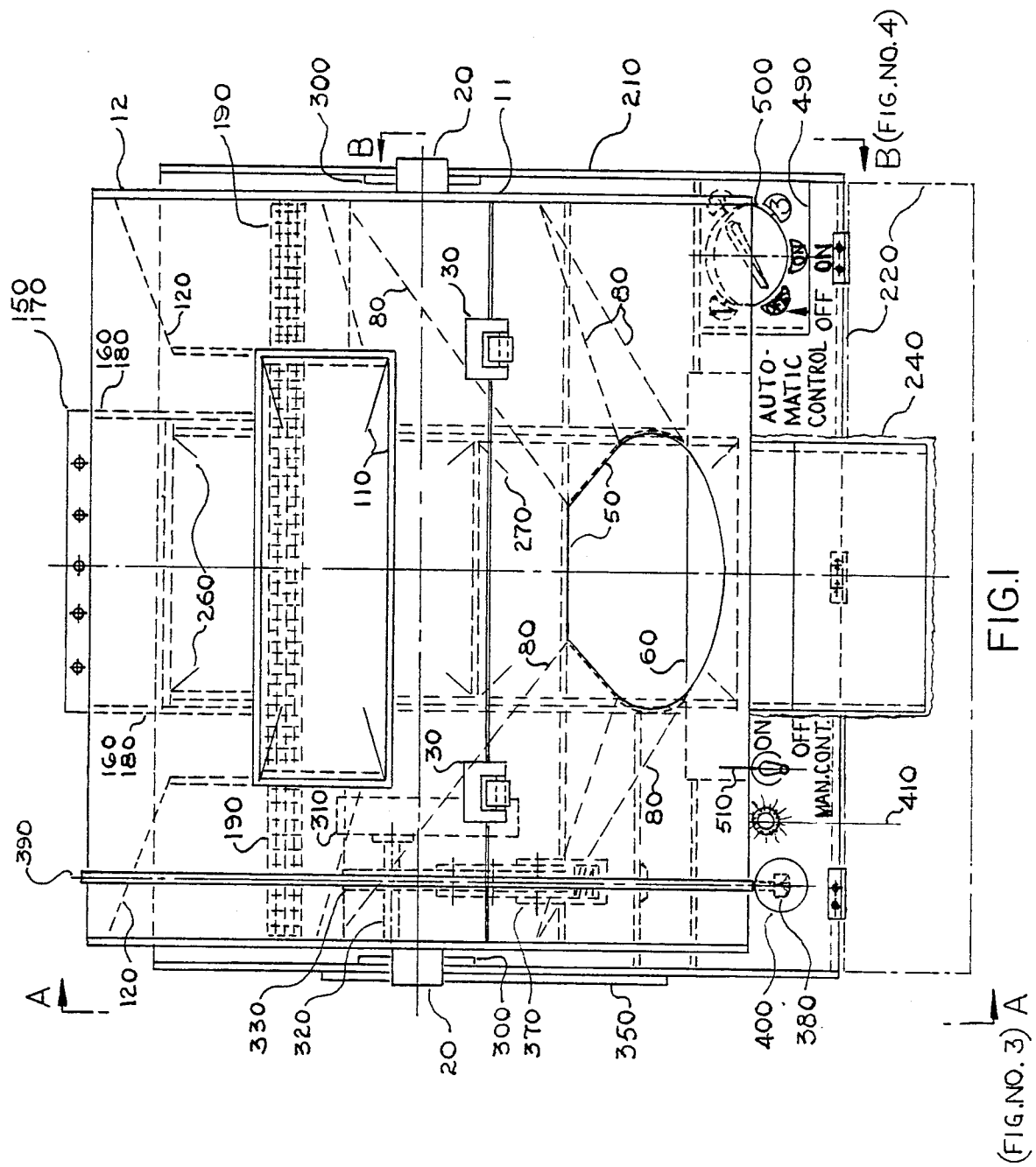
FIG. 1 is a plan view of the automatic cat toilet.
Figure 2:
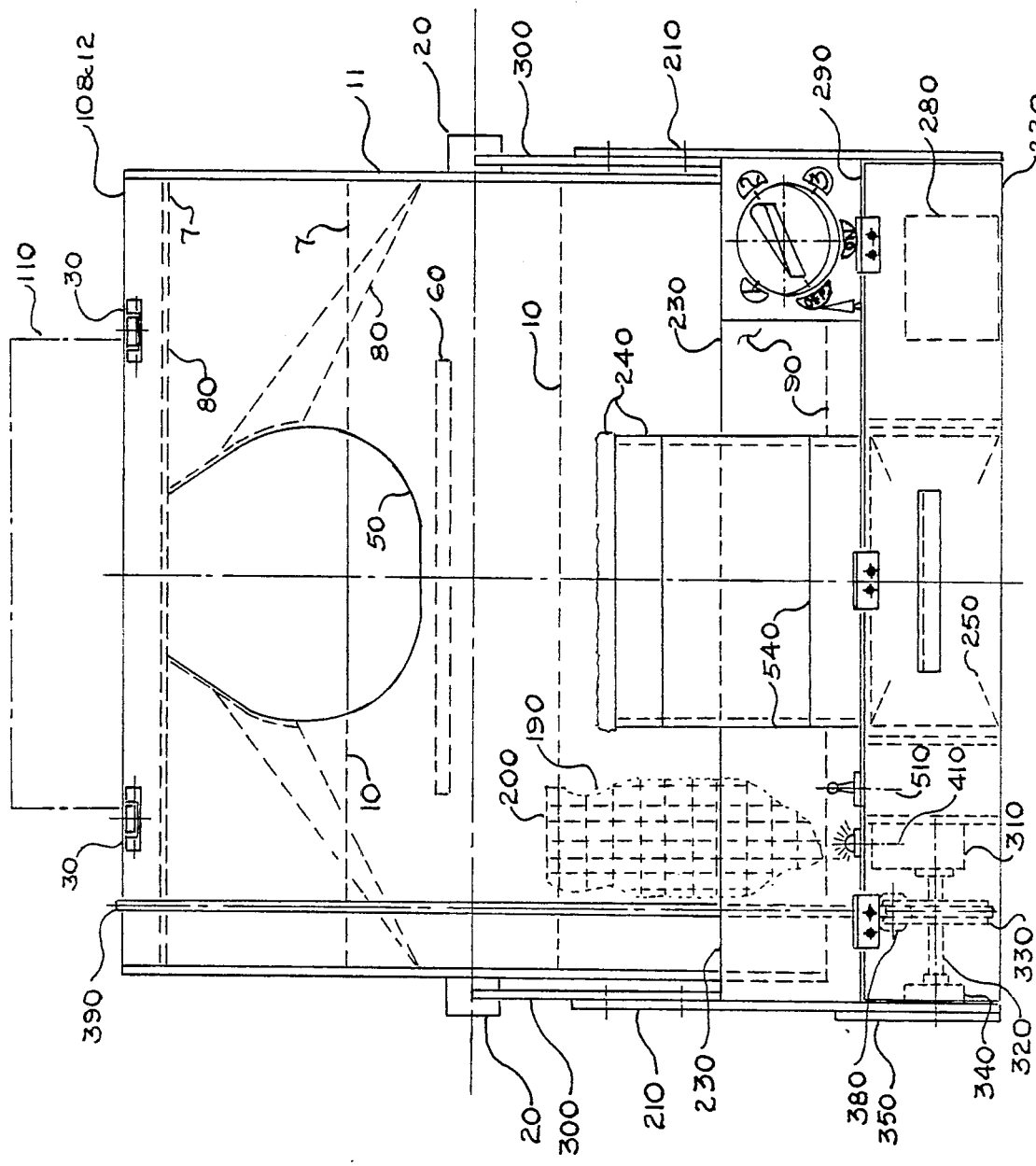
FIG. 2 is a front elevation of the automated cat toilet.
Figure 3:
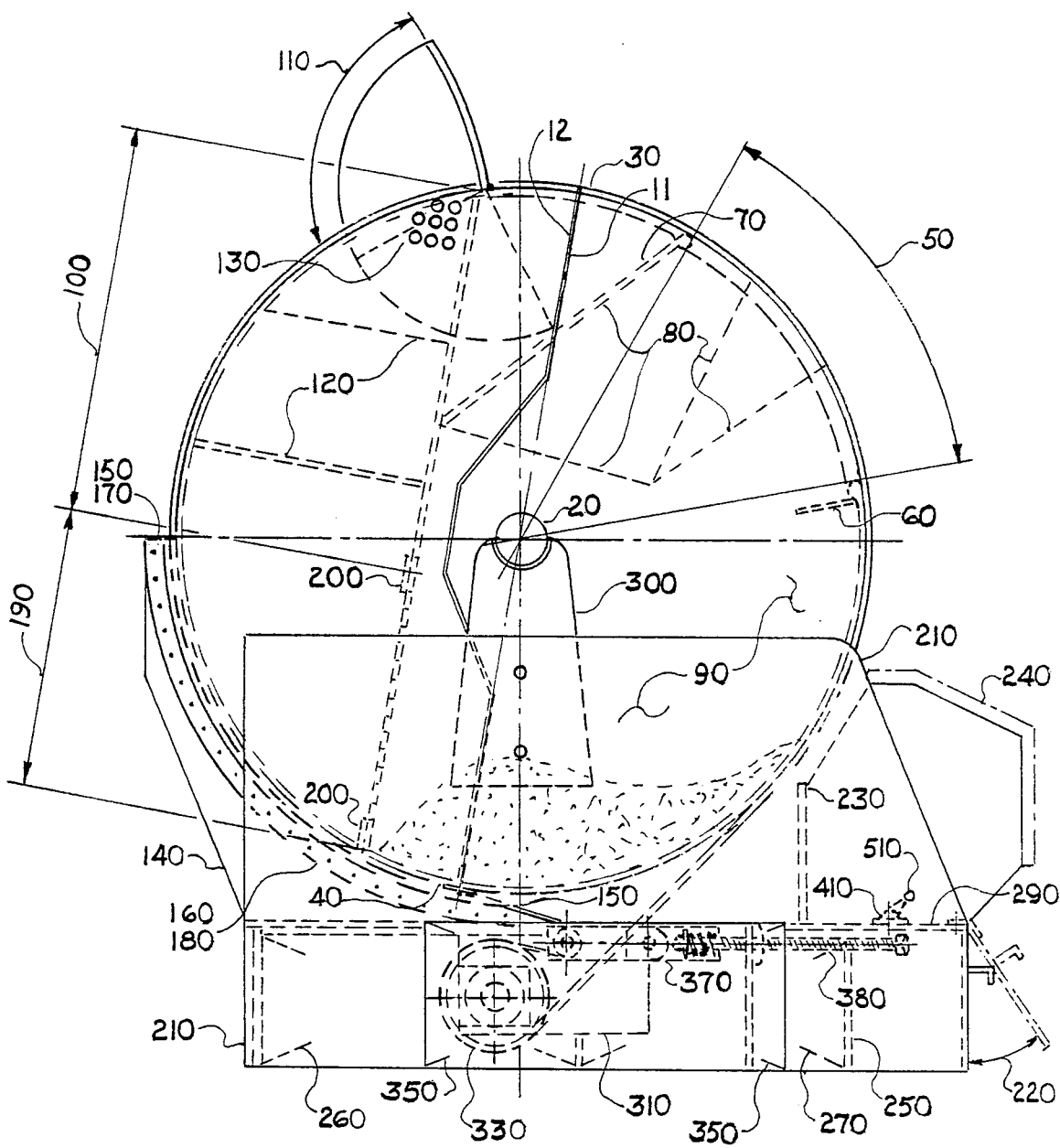
FIG. 3 is a drive end elevation, taken at A—A of FIG. 1, of the automated cat toilet.
Figure 5A:
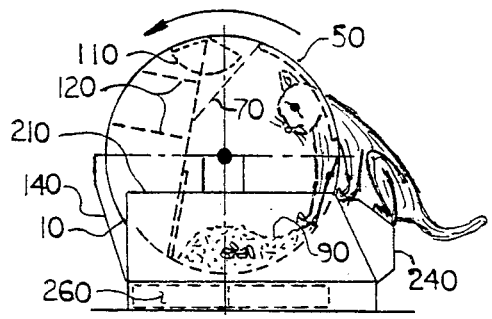
FIGS. 5A-5F are diagrammatic side elevations showing the several operational positions, position A to position F, of the automated cat toilet.

A cat, intent on discharging waste, enters the cat litter primary storage area 90, through cat entrance 240 as shown in position A, FIG. 5A. The primary storage area 90 is enclosed by the circular housing 10, 11 and 12, the ends of the circular housing, a solid partition 70, side sections waste discharge chutes 80, solid partition 100 in part and flat screens 190. To maximize litter containment within the circular housing 10, during cat waste deburying, a cat litter deflector 60 is mounted at the lower part of the cat entrance 50.

When observation indicates cat disturbance of the cat litter in the primary storage area 90, the operation of the automated toilet may be started by setting the hand knob 500, of the control assembly 420, from one (1) to four (4) cycles, as desired. Setting of the hand knob 500 at the desired cycle/cycles will rotate cam 470, closing electrical switch 480, illuminating the red running light 410, allowing electric power to flow to the mini-gearmotor 310, and starting rotation of the circular housing 10 by means of the drive shaft 320, drive pulley 330, idler pulley 360, takeup assembly 370 and drive belt 390.

Figure 5B:
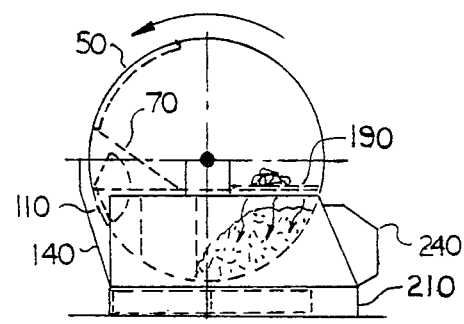
Figure 5C:
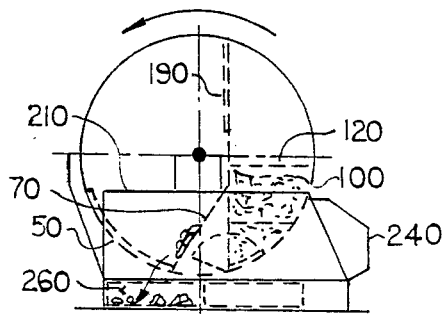

As the circular housing 10 rotates in a counterclockwise direction, as observed in position A, FIG. 5A, the cat litter flows by gravity, in the first pass, through the litter screens 190, from the primary to the secondary storage areas part 90 to part 100, causing the cat solid wastes and urine saturated clump waste to be retained in the primary storage area 90 side of the litter screens 190, as shown in position B, FIG. 5B As the cycle continues, the circular housing 10 rotates to position the solid partition 70 and side sections waste discharge chute 80 in a near vertical attitude thereby causing the solid and clump waste to fall by gravity into the disposable waste bag liner and drawer 260, as shown in position C, FIG. 5C. Also, simultaneously, the first pass, screened cat litter, is temporarily stored within the cat litter secondary storage area 100.

Figure 5D:
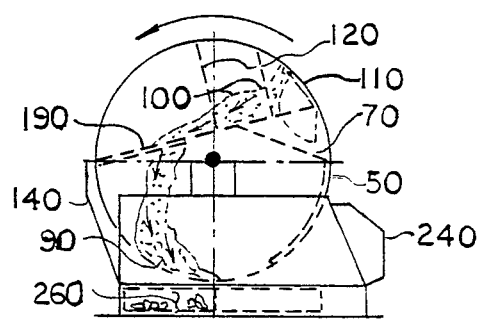

Continuation of the cycle of the circular housing 10 positions the solid partition, secondary storage area 100 and litter screens 190 to a downward slope, effecting a gravitational flow and a second pass, of the cleaned and temporarily stored cat litter, from the secondary storage area 100, to the primary storage area 90, as shown in position D, FIG. 5D, thereby restoring the litter primary storage area 90 to the original ready condition, before the deposit of cat waste. The circular housing 10 continues to rotate to complete the last cycle until it reaches position A, shown on FIG. 5D. At that time the housing cycle actuator 430 engages the control assembly 420 and shuts off the electrical power to the mini-gearmotor 310 and stops the rotation of the circular housing 10. At this point all of the cleaned cat litter has been returned to the litter primary storage area 90.

In the process description above, reference is noted to the 'first' and 'second' pass of the cat litter over the litter screens 190. The automated gravitational flow of the cat litter is an important function of this invention since the screening process provides the multiple mechanical functions of separation, aeration and blending of the unused dry cat litter with the litter that was initially in contact with the rejected solid and clump waste for a rejuvenated, homogeneous, renewed cat litter mass.

The control assembly 420, referenced in the above description, start and stop procedures, is a mechanical means of automatic control of the circular housing 10 and is representative as only one of numerous mechanical and electronic means to accomplish the same results of hand setting of one or more rotating cycles of the circular housing 10 and automated stopping of same. To start the control procedures of the circular housing 10 set the hand knob 500 for the numbers of cycles desired, of one (1) to four (4) cycles, as shown on indicator 490. Indicator 490 also shows electrical power on and off positions. Setting of the hand knob 500 to a cycle start position, rotates the bevel pinion gear and shaft 460 and cam cycle control 470. The rotation of cam 470 depresses the pivoted level of electric control switch 480, closing the electrical power circuit to energize the mini-gearmotor 310 and start the rotation of circular housing 10.

Automatic stop of circular housing 10 occurs when the housing cycle actuator 430 engages the cycle pins of the bevel ring gear 440 causing the ring gear to rotate and, by meshing the bevel ring gear 440 with bevel pinion gear 460, the pinion gear is caused to rotate 90°.

The bevel pinion gear and shift 460 cause the cam cycle control 470 to rotate 90° and perform one of two functions. Either advance the cam 470 and hand control knob 500 to the next cycle selected or advance the cam 470 and hand control knob 500 to the off position as shown on the indicator 490.

Cam 470 in the off position releases the pivoted level of electric control switch 480, opening the electrical control switch 480 and removing power from the mini-gearmotor 310. The circular housing 10 is now stopped.

Figure 5E:
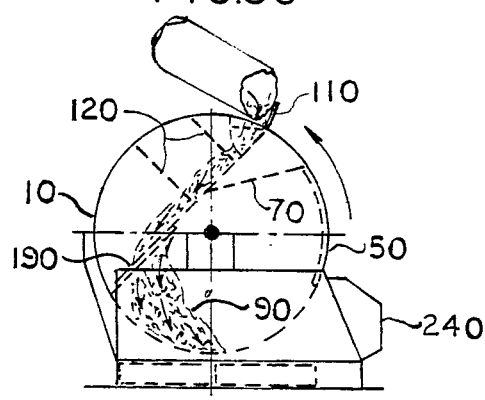

Cat litter fill of the circular housing 10 is done by positioning the circular housing 10 to position E as shown on FIG. 5E by use of the manual control switch 510. Open the cat litter fill and removal door 110 at the top of the circular housing 10 and fill the housing 10 with cat litter in the amount of litter desired. The cat litter will fall through the secondary storage area 100, over the litter screens 190 and into the primary storage area 90. Close the cat litter fill and removal door 110 and with the manual control switch 510, advance the circular housing 10 to position A as shown on FIG. 5A.

Figure 5F:
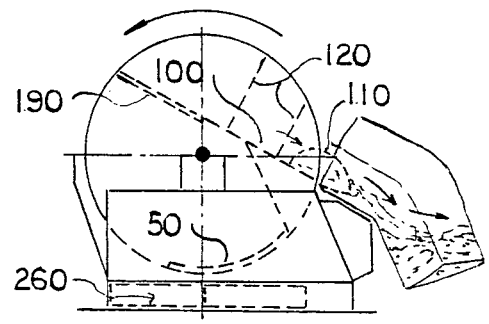
Figure 5G:
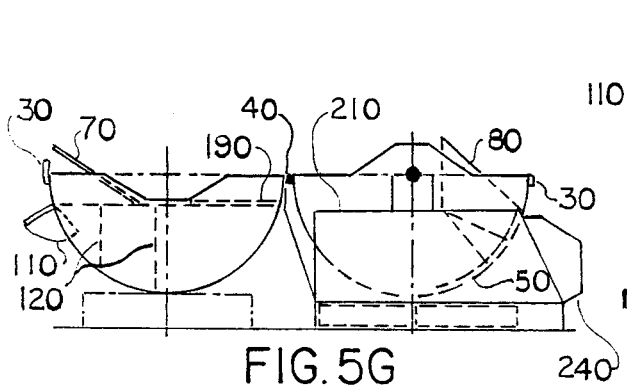
FIGS. 5G-H are a diagrammatic side elevation and plan view, respectively, showing positions G and H of the procedure for internal washing for the automated cat toilet.
Figure 5H:
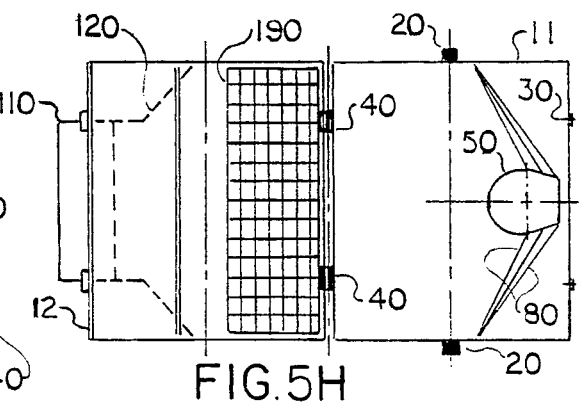

Used cat litter may be removed by advancing the circular housing 10 to position F as shown on FIG. 5F, positioning the cat litter fill and removal door adjacent to the cat entrance step 240. Place a disposable bag, e.g., a kraft grocery bag, under the cat litter fill and removal door 110. Open the removal door 110 and allow the used cat litter to flow into the bag. Tap the circular housing 10 by hand and tilt the housing toward the bag, to cause any remaining used cat litter to flow into the bag. When all the used cat litter has been emptied from the circular housing into the bag, remove and close the bag for disposal. Close the cat litter fill and removal door 110 and advance the circular housing 10, by use of the manual control switch 510, to the cat litter fill position or to the position for internal washing of the circular housing 10 as shown on FIGS. 5G and H, positions G and H.

The procedure for internal washing of the circular housing 10 may be started after the used cat litter has been removed as previously described. By pushing the manual control switch 510 to the on position, advance the circular housing 10 so that the split housing snap locks 30 are positioned about three (3) inches above the cat entrance step 240 and the joint of the circular housing halves 11 and 12 are approximately horizontal, then stop the housing rotation by reversing the position of the manual control switch 510 to the off position. Continuously turn the takeup adjusting screw 380 clockwise, to the point that the drive belt 390 may be loose enough so as to be easily slipped over the end of the circular housing 10, allowing the drive belt 390 to fall down over the end of the support stand 210. Release the split housing snap locks 30 and open the circular housing half 12 (without shaft) and allow to rest on a prepositioned temporary support, 180° from circular housing half 11 and shown in position G, FIG. 5. The circular housing halves 11 and 12 may be lifted by hand from the support stand 210 and placed on end as shown in position H on FIG. 5, for washing and wiping as required.

Drive belt 390 is the only means for securing the circular housing 10 to the support stand 210. The drive belt 390, when tensioned by the takeup assembly 390, holds the circular housing 10 in a stable and rigid position, when not rotating, providing a fixed, immovable cat litter primary storage area 90 for cat occupancy and cat waste discharge.

The circular housing halves 11 and 12 may be separated by removing the hinge pins 40 and the halves washed separately, for ease in handling.

Therefore, an important object of this invention is to separate cat solid waste and urine saturated litter clumps from the surrounding dry cat litter, within a circular housing, by the application of rotary motion to the circular housing and to direct the solid waste and urine saturated litter clumps to a disposable waste bag placed in a waste drawer under the circular housing.

A further important object of this invention is the use of a circular housing designed in size to accommodate the occupancy of a full size house cat, the storage of cat litter and equipped with the necessary internal partitions, screens, chutes and openings for the purpose of providing an enclosed space for a house cat to naturally deposit the cat's solid and liquid waste within the cat litter contained within the circular housing.

A further important object of this invention is the application of internal partitions, screens and chutes contained within the circular housing for the purpose of containing the cat litter in the primary storage area and then by rotary motion of the circular housing directing the cat litter over flat screens, to retain cat's solid and liquid clump waste within the primary storage area. At the same time the separated litter will flow through the flat screens thereby providing litter aeration, followed by temporary litter storage in the litter secondary storage area.

A further important object of this invention is the rotary motion applied to the circular housing by means of a minigearmotor, drive shaft, drive pulley, idler pulley, takeup assembly, flat drive belt and hand knob cycle selection, set for one (1) to four (4) cycles of rotary motion. The 360° rotation of the circular housing causes the double flow of the cat litter through the cat waste separation flat screen, and therefore double litter aeration.

A further important object of this invention is the conveyance of the deposited cat solid waste and liquid clump waste from the primary storage area to the disposable waste bag liner in the waste drawer, by means of the rotary motion of the circular housing to approximately 170° from the original position of the circular housing and cat waste deposit. As the circular housing rotates, the solid and clump waste is directed from random locations within the litter in the primary storage area, to the upper portion of the repositioned cat entrance opening, of the circular housing, by means of side section waste discharge chutes and then to the disposable waste bag liner, as the circular housing completes approximately 170° of the 360° cycle.

A further important object of this invention is the completion of the cycle of rotation of the circular housing through the remaining approximate 190°, effecting the gravity return of the cleaned cat litter from temporary storage in the secondary storage area, through the flat screen, to the cat litter primary storage area.

A further important object of this invention is the litter fill an removal door and litter chutes, providing for filling the circular housing with new fresh litter or the removal of used litter to a waste bag for disposal. By positioning the circular housing to the "new litter fill" or the "used litter removal" positions with the manual start/stop electric switch, the litter filling or used litter removal procedures may be completed. Circular housing rotation allows the collection of the cat litter within the secondary storage area, adjacent to the litter fill and removal door, ready for litter change as necessary.

A further important object of this invention is the application of a series of housing vent holes at each top side of the circular housing, the top being defined as the top of the circular housing when the cat entrance at the circular housing is positioned ready for cat entrance. The circular housing vent holes will serve as housing exhaust vents. Air entering the circular housing at the cat entrance will move through the circular housing and then exit the circular housing through the housing vents to the surrounding atmosphere. The movement of air through the circular housing will aid in the removal of extraneous cat waste odors from the cat litter primary and secondary storage areas. Additional assistance in the relief of cat odors can be provided by the use of a deodorant contained within a plastic case, "sticky contact" mounted in an alternate location on the partition in the litter secondary storage area, remote from and out of contact with the cat use litter primary storage area. The remote location of the deodorant, in the litter secondary storage area removes the possibility of any direct adverse chemical effects of the deodorant upon the cat.

A further important object of this invention is in the pedestal support stand with side supports to accommodate the end shafts of the rotating circular housing. The pedestal support stand is equipped with a front access door across the entire width of the stand, lifting up to open, a circular housing protector plate as a space closure for the housing drive and control components. The pedestal support stand is also the foundation for the sealing assembly, the mini-gear-motor drive arrangement an the circular housing control assembly. The pedestal support stand includes space for the waste storage drawer, the cat entrance step and a front deck for mounting the red running light, the manual electric start/stop switch, hand knob cycle selection assembly and visual access for the takeup assembly adjusting screw.

A further important object of this invention is the waste and storage drawer located under the pedestal support stand. The drawer is compartmentalized with waste compartment A for accommodating the disposable waste bag liner and compartment B as storage for extra bags and tools. The disposable waste bag liner is a stretch fit on four protrusions at the top edge of compartment A forming a fluff and loose fit to the periphery of the circular housing, above.

A further important object of this invention is the sealing assembly for sealing the space between the rotating circular housing and the disposable waste bag liner, in compartment of the drawer under the pedestal support stand. The seals are designed to contain, within the space above the waste drawer, the odors resulting from the cat wastes deposited in the disposable waste bag liner. The seals completely close off the space between the periphery of the circular housing above and compartment A of the waste drawer, when the circular housing is in the rest position and ready for cat use. The space above and around compartment A is open to the waste discharge chutes during the cat waste conveyance phase only, when the circular housing is positioned in the 170° waste conveyance attitude.

A further important object of this invention is the cat entrance step of the circular housing protector plate. The cat entrance step is located directly in front of the circular housing cat entrance and on the top of the pedestal support stand front deck for the purpose of assisting cat access to the cat entrance. The step is covered with a carpet material to aid in cat footing and claw sharpening by scratching.

A further important object of this invention is the circular housing drive assembly to effect the housing rotation at the rate of one (1) revolution in approximately 1.4 minutes. The slow rate of rotation of the circular housing produces the retarded, deliberate tumbling action of the cat litter, thereby enhancing litter aeration and freshness. The constant speed minigearmotor drive output is connected to a drive pulley by a main drive shaft. The drive pulley turns a fabric/rubber drive belt with approximately 220° of drive pulley belt wrap. the drive belt contacts and directly wraps approximately 310° around the circular housing to produce housing rotation. The belt is manually tensioned by a takeup assembly consisting of a belt takeup idler pulley, takeup assembly linkage and takeup adjusting screw. The takeup adjusting screw is adjusted with a screwdriver from the front of the support stand by raising the front access door. Access to the drive belt and drive and idler pulleys is gained by removal of the access and bearing support panel attached to the support stand sideplate. The access panel is further utilized as a support for the mini-gearmotor main drive shaft outer bearing.

A further important object of this invention is the control of the mini-gearmotor and rotation of the circular housing. The hand knob control can be set from one (1) to four (4) revolutions of the circular housing. The hand knob turns a cam which actuates an electric switch to an open or closed position. The cam is also actuated by a series of beveled gears, cam drive shaft, and a cycle actuator bracket attached to the circular housing for automated operation, after starting the circular housing rotation. The housing cycle actuator actuates the cam and advances the control assembly from a one cycle to the next or completes a single cycle and shuts off the mini-gearmotor. The control of the circular housing rotation also includes the application of a manual control on/off switch, independent of the automated control, for the purpose of unlimited circular housing cycles or positioning the housing as desired for litter removal/filling. A red running light illuminates when either automated or manual operation is initiated.

A further important object of this invention is the specific design and hardware integral with the circular housing for the purpose of integral washing with water and soap as may be desired. The circular housing is designed in halves, joined at one side of the halves by hinges with removable hinge pins and by snaplocks at the opposite side to form a single, rigid unit. Washing is accomplished by the removal of the litter from the circular housing by use of the takeup adjusting screw and the lifting and removal of the circular housing to a convenient washing area. The circular housing, placed on end, can be separated in halves by release of the snaplocks allowing the opening and exposure of the internals of the housing halves. Further disassembly, removal of the hinge pins allows each housing half to be washed, rinsed and dried separately.

Other advantages and features of the invention will be apparent from the following description of a preferred embodiment thereof and from the claims.

I claim as my invention:

1. Apparatus for mechanical separation of cat solid waste, randomly buried in cat litter, and cat urine saturated litter clump waste from surrounding clean cat litter and mechanically removing said waste to storage, comprising, a support including a waste collection region, circular housing that is rotatably mounted about its axis on said support over said waste collection region, said housing having an opening in its periphery for passage of a cat when in a first rotational position and for passage of said solid waste and litter clump waste when in a second, downwardly directed, rotational position over said waste storage region, a solid partition extending inwardly from said periphery at a location adjacent to said opening so as to trap litter on the side opposite of said solid partition from said opening when said opening is in said second rotational position, a screen that retains said solid waste and litter clump waste, said screen extending inwardly from said periphery at a location spaced from said solid partition so as to pass through said litter as said housing is rotated in a manner that causes said opening to move from said first rotational position to said second rotational position, whereby when said housing rotates through a complete revolution, said solid waste and litter clumps are automatically discharged through said opening into said waste collection region, said litter is automatically sifted and aerated by passing twice through said screen, and said litter is retained in said housing.

2. The apparatus of claim 1 wherein said housing has an access door in its periphery at a location on an opposite side of said solid partition and said screen from said opening.

3. The apparatus of claim 1 wherein said housing is cylindrical, and said opening is narrower than the length of said housing, and further comprising chutes extending inwardly in said housing from the longitudinal ends of said housing toward said opening so as to direct said solid waste and litter clump waste to said opening when said opening is in said second rotational position.

4. The apparatus of claim 1 wherein said housing is made of two pieces that can be separated for cleaning.

5. The apparatus of claim 1 further comprising a removable drawer that can be moved into said waste collection region to collect waste falling through said opening and can be removed from said support.

6. The apparatus of claim 5 wherein said waste collection region is sealed to the outer periphery of said housing so as to prevent odors from escaping from said waste collection region.

7. The apparatus of claim 1 further comprising a motor connected to rotate said housing.

8. The apparatus of claim 7 further comprising means for causing said housing to stop rotating when said opening is in said first rotational position.

9. The apparatus of claim 7 further comprising control means to cause said motor to rotate said housing a plurality of rotations.

* * * * *